United States Patent
Zuccarini

(12) 
(10) Patent No.: US 6,187,359 B1
(45) Date of Patent: Feb. 13, 2001

(54) METHOD AND APPARATUS FOR BAKING FOODS IN A BARBEQUE GRILL

(76) Inventor: Anthony Mark Zuccarini, 200 Pretoria Ave., Apt. C-2, Ottawa, Ontario (CA), KlS 1X2

(*) Notice: Under 35 U.S.C. 154(b), the term of this patent shall be extended for 0 days.

(21) Appl. No.: 09/465,385

(22) Filed: Dec. 17, 1999

Related U.S. Application Data

(60) Provisional application No. 60/133,879, filed on May 12, 1999.

(51) Int. Cl.[7] ............................ A21B 1/00; A23L 1/00; A47J 37/00
(52) U.S. Cl. .................. 426/505; 99/401; 99/447; 99/450; 126/25 R; 126/41 R; 126/273 R; 126/275 R; 426/523
(58) Field of Search ................... 426/505, 523; 99/401, 447, 448, 450; 126/25 R, 41 R, 273 R, 275 R, 337 R

(56) References Cited

U.S. PATENT DOCUMENTS

| | | | |
|---|---|---|---|
| 1,862,420 | 6/1932 | O'Brien | 99/450 |
| 2,722,883 | 11/1955 | Rignell | 99/447 |
| 3,040,651 | 6/1962 | Nolte, Jr. | 99/450 |
| 3,548,736 | 12/1970 | Wahl | 99/450 |
| 3,786,741 | 1/1974 | Plumley et al. | 99/447 |
| 3,793,936 | 2/1974 | Wills | 99/447 |
| 4,332,828 | 6/1982 | Gallagher | 426/523 |
| 4,446,776 | 5/1984 | Gelfman | 99/447 |
| 5,211,105 | 5/1993 | Liu | 99/450 |
| 5,242,704 | 9/1993 | Prestigiacomo | 426/523 |
| 5,365,833 | * 11/1994 | Chen | 99/447 |
| 5,437,222 | 8/1995 | Franklin | 99/450 |
| 5,458,054 | 10/1995 | Yu | 99/450 |
| 5,523,104 | * 6/1996 | Kirk | 99/447 |
| 5,562,023 | 10/1996 | Harrison | 99/450 |
| 5,605,143 | 2/1997 | Hebert et al. | 99/450 |

* cited by examiner

Primary Examiner—George C. Yeung

(57) ABSTRACT

A grill overlay unit makes it possible to use a gas barbeque as a baking oven for baking such items as a pizza. The unit includes a flame resistant metal plate for placing over a barbeque grill, the plate having a series of louvered openings which allow heat to rise from the barbeque flames while blocking the flames. A support is provided for a baking pan a spaced distance, e.g. about 2 to 6 inches, above the louvered plate to provide a zone of uniform heating in the space between the louvered plate and the baking pan. This heating zone is preferably enclosed by side walls extending upwardly from the periphery of the louvered plate, with the top edge of the side walls serving as a support for a baking pan. With this arrangement, a food item such as a pizza may be perfectly baked under controlled, uniform heat within a backyard barbeque.

17 Claims, 4 Drawing Sheets

METHOD AND APPARATUS FOR BAKING FOODS IN A BARBEQUE GRILL

This application claims the benefit of U.S. Provisional Application 60/133,879 filed May 12, 1999.

BACKGROUND OF THE INVENTION

The present invention relates to baking tools and, in particular, to a baking implement for use in a standard barbeque grill.

Cooking of foods on a barbeque grill has become an extremely popular method of food preparation around the world, be it in the backyard, at a picnic, etc. The typical modern barbeque grill comprises a heat source in the form of a gas burner and a grill suspended above the heat source. This grill serves as means to support the food being cooked over the heat source. Foods typically grilled in this way include chicken, beef, pork, etc. In order to contain the heat, most modern barbeque grills also include a hinged lid or cover which provides a substantial enclosed space above the grill.

One example of a modern barbeque grill is that shown in Presigiacomo U.S. Pat. No. 5,242,704, patented Sep. 7, 1993. It shows a special type of flame suppressant marinating grill overlay which is particularly designed to collect juices from the food and prevent them from falling down into the flame. This is typically intended for the grilling of meats, with flammable animal fats being collected.

Another form of barbeque system is shown in Gallagher U.S. Pat. No 4,332,828, patented Jun. 1, 1982. It shows a grill overlay in the form of a flat rigid pad having a central core of heat insulating material supported between two sheets of reflective material, such as foil. The idea behind this is to form a kind of convection oven within which food such as a meat roast can be cooked without drying out.

Other forms of grill overlays have been proposed such as that shown in Plumley U.S. Pat. No. 3,786,741, patented Jan. 22, 1974. This device utilizes a quite heavy structure for placing over a grill which is a closed heat reflective member and support member. It is designed to combine both smoking and cooking in a single operation, i.e. it is designed to permit a flow of smoke around the food.

It is an object of the present invention to provide a form of barbeque grill overlay and support which will permit a barbeque with the lid closed to function as a baking oven, within which such things as cakes, pizza and other pastries may be baked.

It is a further object to provide a baking support unit particularly adapted for baking pizzas.

It is a still further object of the invention to provide a unit for supporting a baking pan within a closed barbeque having a separate enclosed heating zone beneath the baking pan.

SUMMARY OF THE INVENTION

In one embodiment, the present invention relates to a method of baking foods on a barbeque grill having a closed top. A flame suppressant and heat dispersing grill overlay is provided for placing on the grill. This overlay is a flame resistant metal plate having a plurality of small openings therein whereby heat from the flame flows upwardly through the small openings such as to provide a zone of uniform heating within the barbeque above the plate. A support rack is arranged to sit above the flame resistant plate and is adapted to sit above the flame resistant plate and is adapted to hold a baking pan preferably about 2 to 6 inches above the plate. A baking pan containing food to be baked, e.g. a pizza, is placed on the support rack and the food can then be baked in the baking pan under controlled uniform heat within the barbeque without direct flame heating of the pan.

In a preferred embodiment, the flame suppressant and heat dispersing grill overlay of this invention is of a special design which lets a uniform flow of heat pass through the plate while suppressing any direct flame. This is achieved by providing a series of small louvered openings in the plate which serve to prevent the flame from passing through the openings while allowing heat from the flame to pass through. By providing this design of flame suppressant and heat dispersing plate and the raised support rack for supporting a baking pan, a very uniform heating is achieved similar to a standard baking oven. The result is that excellent baked products can be baked in a barbeque. This is of particular interest for the baking of pizzas, but it can be used for other baking purposes.

The louvered openings are typically in the form of louvered slits, which may be arranged in a variety of configurations within the plate. The important advantage of the louvers is that they allow for greater variation in the level of flame from the barbeque burner without overcooking or burning the bottom of a baking pan. This becomes very significant at a backyard party where the person attending to the barbeque may not be giving individual attention to what is cooking on the barbeque. Thus, even if the flame is left at too high a level for a period of time, it does not rise up and sear the bottom of the baking pan. Instead, there is only a gradual increase in the heat beneath the pan in the same manner as a regular baking oven that becomes hotter than desired.

It has also been found to be advantageous to have the grill overlay unit in the form a louvered metal plate as described above and enclosing side walls extending upwardly from the periphery of the plate. When a baking pan is placed on top of these side walls, an enclosed heating zone is created above the louvered plate and beneath the baking pan.

It has been found to be convenient to form the enclosing side walls and louvered metal plate as separate items with the louvered plate placed within the side walls. Accordingly, to a preferred feature, the louvered plate sits on and is rotatable on a bottom panel joined to the side walls. This bottom panel has a series of slots mating with the louvered openings such that the air flowing through the louvered openings can be adjusted by rotation of the louvered plate relative to the slotted bottom panel.

It has also been found advantageous to provide for a uniform movement of heated air within the enclosed heating zone beneath the baking pan. One convenient way of achieving this is to provide brackets at the top of the side walls which support the baking pan with a small gap between the top of the side walls and the pan. Another alternative is to provide the enclosing side walls with small openings, preferably in the form of louvered slits similar to those of the bottom plate.

According to a still further feature of the invention, a perforated tray may be provided for setting on top of the side walls and serving as a support for a baking pan, e.g. a pizza pan. The perforated tray preferably includes brackets for connecting a detachable handle. With this arrangement, a baking pan, e.g. a pan holding a pizza to be baked, is placed on the perforated tray, and using the handle, the tray and pizza pan are placed on the grill overlay unit. The handle is then detached and the barbeque lid closed. When the pizza is cooked, the lid is raised, the handle is connected to the perforated tray and the tray with the cooked pizza are lifted out of the barbeque.

While the above description refers primarily to the baking of pizzas and the invention is of particular value for this purpose, it is to be understood that it may be used for a wide variety of baking purposes. Thus, by proper control of heat and using the grill overlay unit of this invention, a gas barbeque can be used to bake most items that would normally be baked in a standard baking oven.

Various features of novelty which characterize that invention are pointed out with particularity in the claims annexed to and forming a part of the specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENTS

Figure 1:
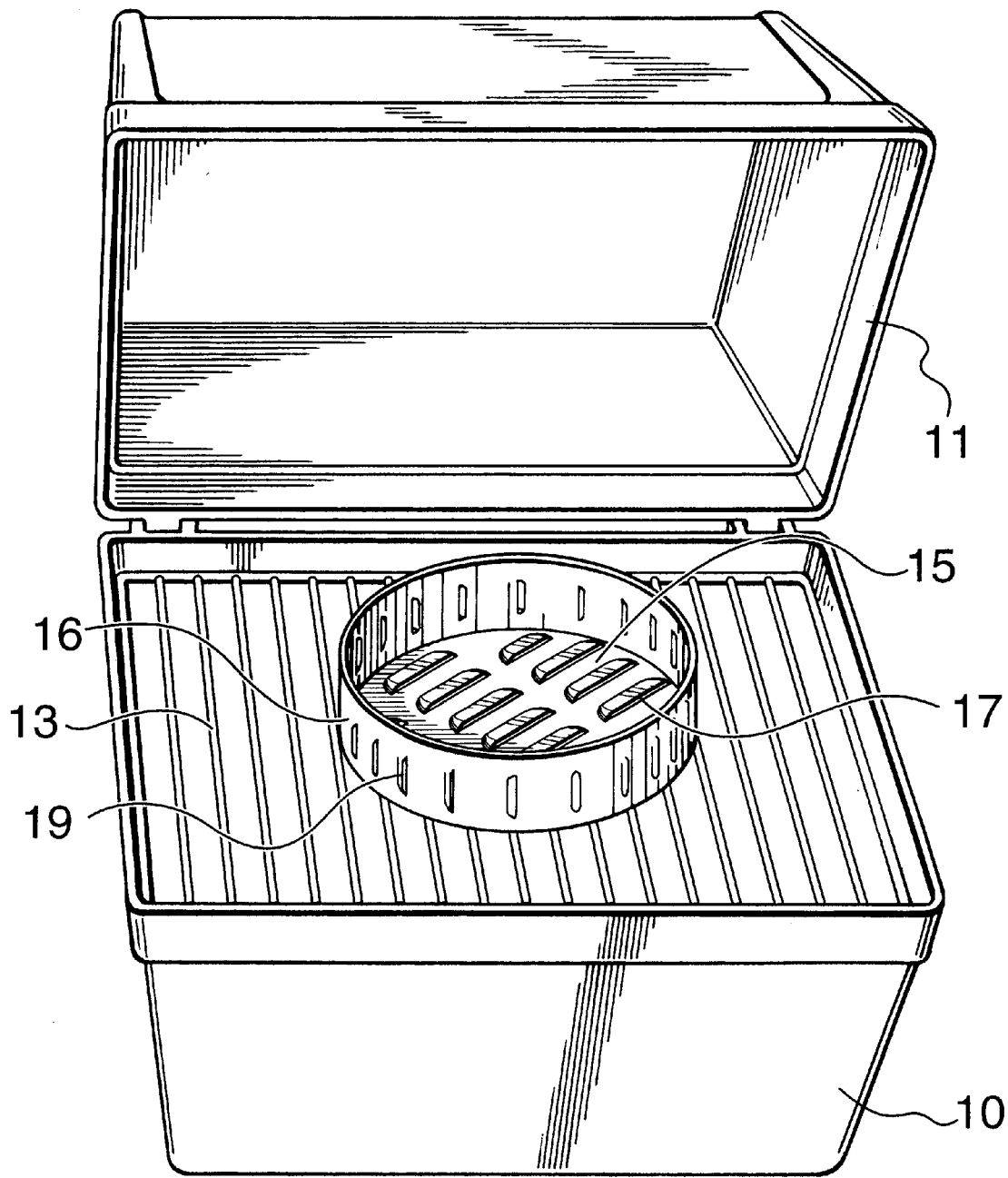
FIG. 1 is a perspective view of a standard gas barbeque with a grill overlay unit of the invention.
Figure 2:
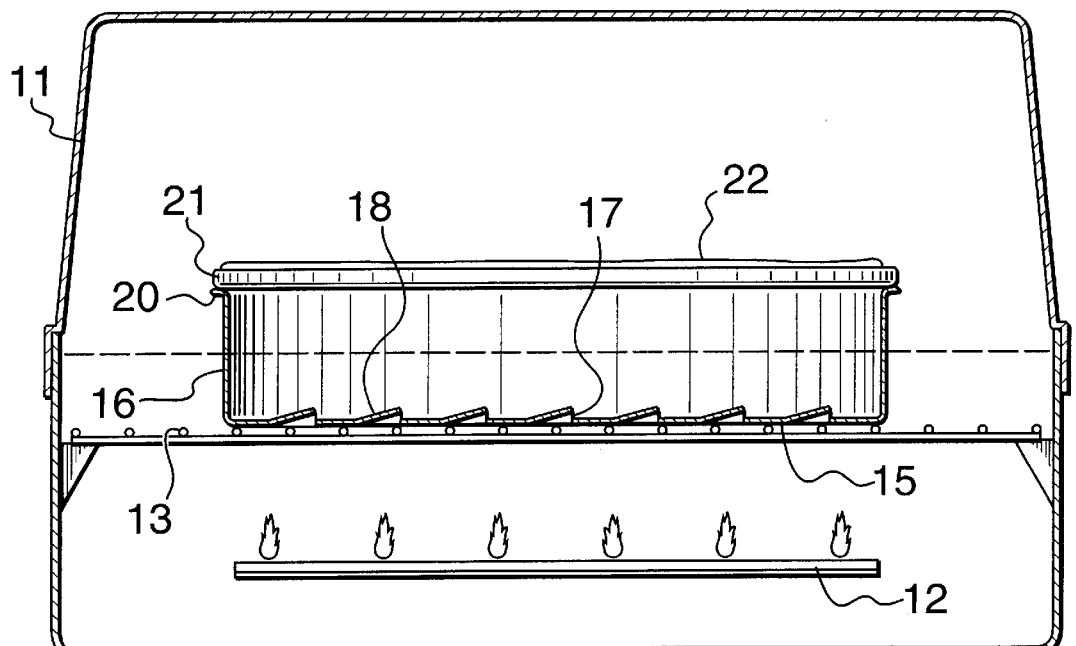
FIG. 2 is a side elevation of the barbeque with the lid closed.

Referring to the drawings, FIG. 1 shows a perspective view of a barbeque grill 10 with a lid 11 in the open position. As can be seen in FIG. 2, the barbeque has a grill 13 mounted on support brackets and includes a gas burner 12 as a heat source.

Figure 3:
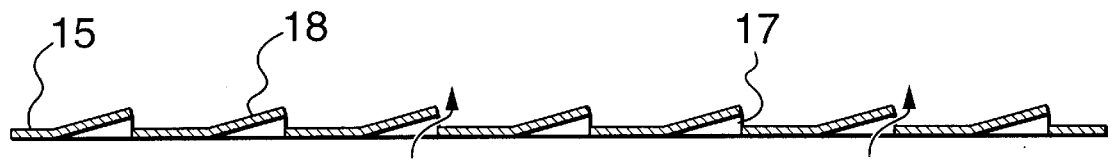
FIG. 3 is a sectional view through a heat dispersing plate.

The main component of the present invention is a flame suppressant and heat dispersing grill overlay plate 15 which sits directly on the grill 13. This plate 15 is formed from flame resistant metal and includes a series of openings to permit heat to pass through but not flame. These openings are formed by cutting a series of slots 17 in the plate as shown in FIG. 3. Portions of the plate are then pushed upwardly adjacent to one edge of each slot to form a type of hood 18 and a horizontally directed opening 17. Heat flows through these openings 17 as shown by the arrows in FIG. 3.

With this arrangement, heat travels upwardly from the burner 12 through the hooded openings 17. By properly selecting the size and number of these openings 17 in plate 15, it is possible to obtain a very uniform temperature throughout the space in the barbeque above plate 15.

It is particularly advantageous according to the invention to provide an enclosed heating area directly beneath the baking pan. Accordingly, it is preferable that the support rack above plate 15 for supporting the baking pan be in the form of an enclosing side wall 16 extending upwardly from the periphery of the plate 15. Thus, as seen in FIG. 2, an item such as a pizza pan 21 holding a pizza 22 may be placed on the top edge 20 of side wall 16 to support the pan. This creates a uniform and constant heating zone beneath the pan 21.

To further improve the uniform heating in the zone beneath pan 21, additional air flow may be provided. In one embodiment, small openings 19 in the form of louvers may be provided in the side wall 16. Alternatively, a small gap may be provided between the bottom of the baking pan and the top edge of the side wall. This feature can be seen in FIGS. 4 and 5.

Figure 4:
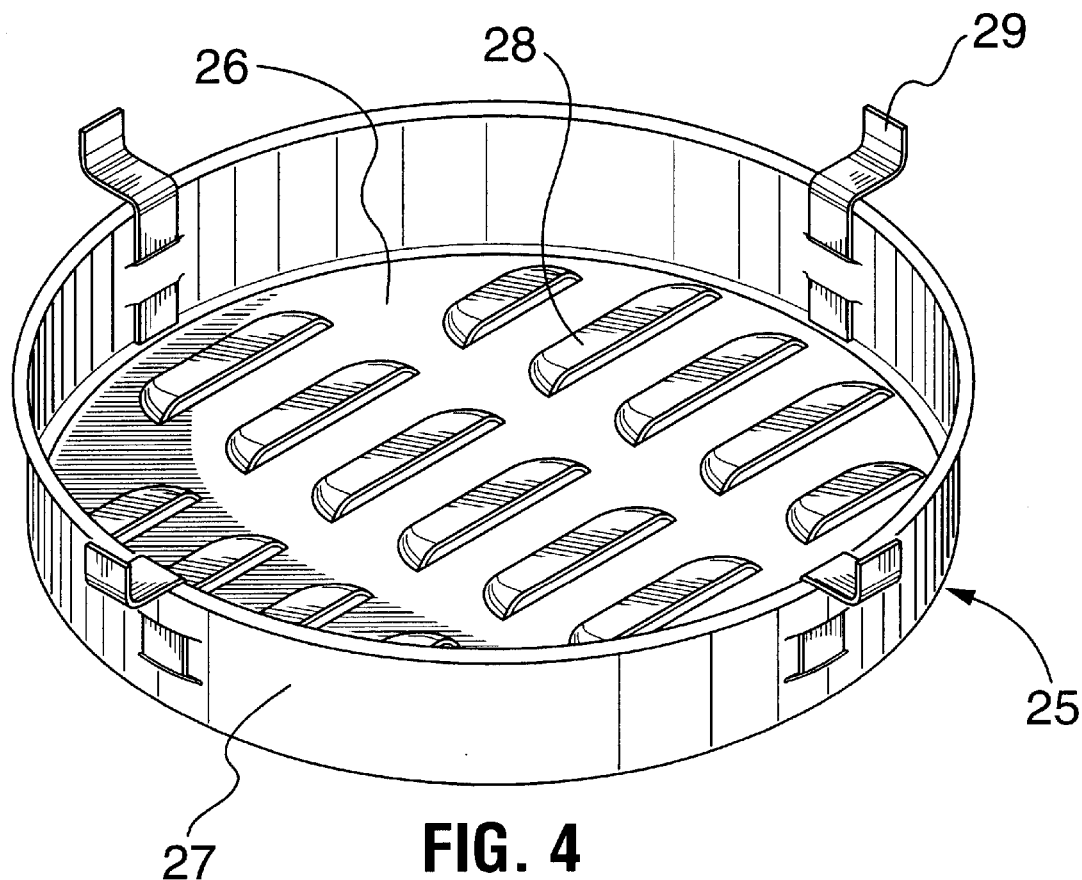
FIG. 4 is a perspective view of a further embodiment of the grill overlay unit.
Figure 5:
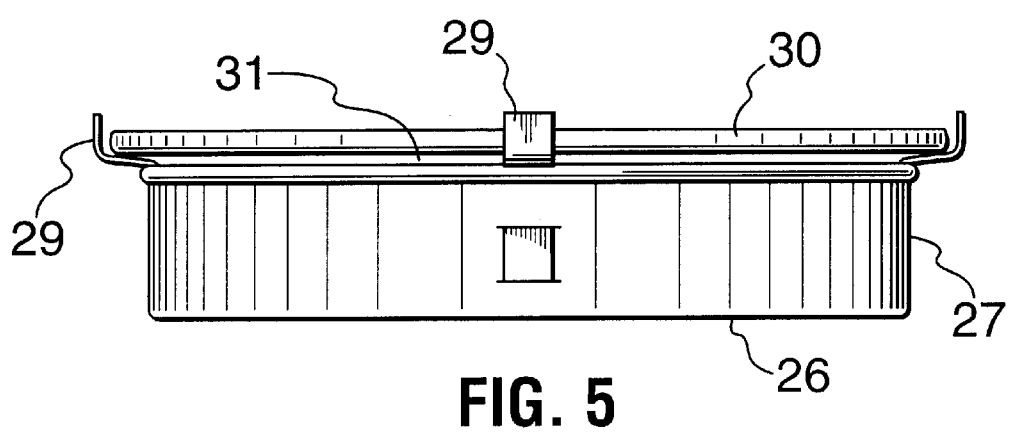
FIG. 5 is a side elevation of the unit of FIG. 4 supporting a baking pan.

Thus, FIGS. 4 and 5 show an alternative embodiment of the invention in which a grill overlay unit 25 has a flat bottom wall 26 with a side wall 27 extending upwardly from the edge of bottom wall 26. A series of louvered openings or vents 28 are provided in the bottom wall 26. The side walls 27 also include support clips or brackets 29 for holding a baking pan 30 as seen in FIG. 5. Also shown in FIG. 5 is a small gap 31 between the top edge of the side wall 27 and the bottom of the pan 30.

The louvered bottom wall 26 is preferably formed separately from the side walls 27. According to a preferred feature, a further bottom panel (not shown) is joined to the side walls beneath the bottom wall 26. This further bottom panel contains slots that mate with the louvers 28 in bottom wall 26 so that when bottom wall 26 is rotated relative to the further bottom panel, the air flow through the louvered openings is adjusted. For this purpose, it is preferred to arrange the louvered openings and mating slots radially.

Figure 6:
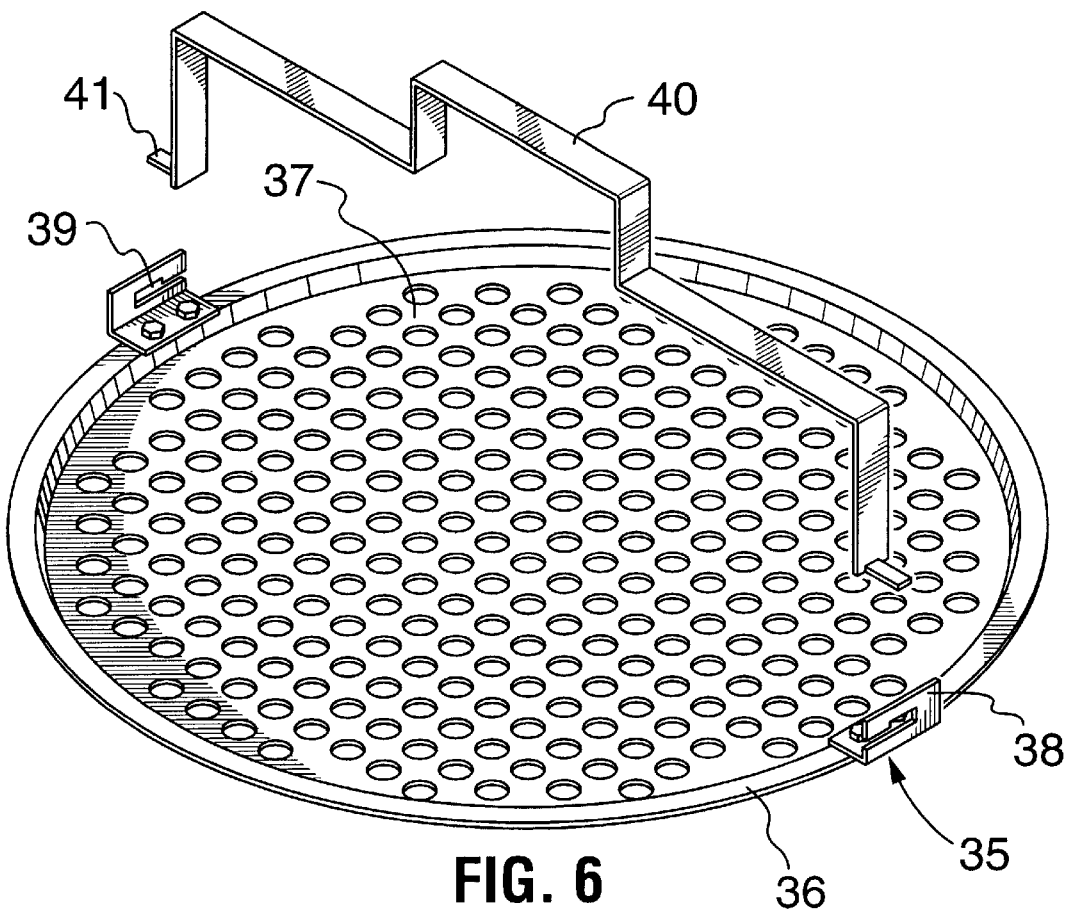
FIG. 6 is a perspective view of a perforated pan supporting tray.

Because a person who is baking with a barbeque must reach directly over the grill for inserting and removing an item for baking, it has been found to be advantageous to provide an additional lifting tray on which a baking pan may be placed. Such a tray 35 is shown in FIG. 6 consisting of a flame resistant metal bottom portion 37 and an edge flange 36. Mounted to the flange are a pair of brackets 38 having slots 39. The tray 35 is intended for use with a handle 40 having projecting tabs 41 for engaging the slots 39.

Thus, for particular convenience, a baking pan, such as a pizza pan, is placed on the perforated tray 35, the handle 40 is attached and using the handle, the tray 35 with the baking pan is placed on top of the grill overlay unit. The handle is then removed and the barbeque lid closed for baking. When the baking is finished, handle 40 is reconnected to the tray 35 and the tray supporting the baking pan baked item, e.g. pizza, is removed from the barbeque without danger to the cook.

Figure 7:
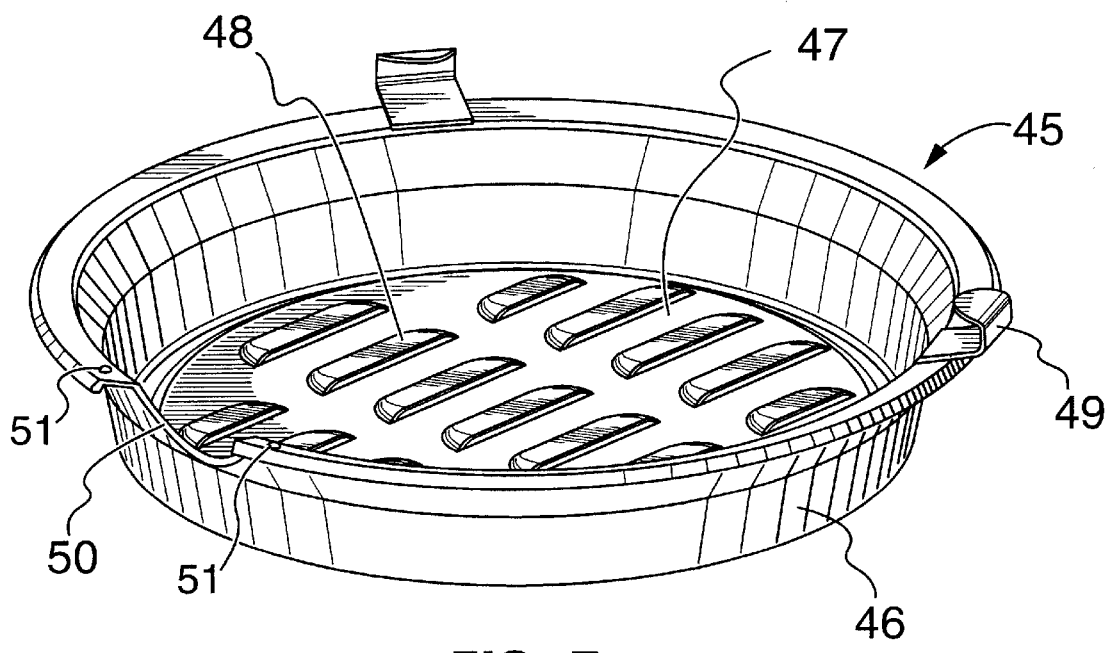
FIG. 7 is a perspective view of a still further embodiment of the grill overlay unit.

A still further embodiment of the grill overlay unit of the invention is shown in FIG. 7. Here the overlay unit 45 includes side walls 46, a flat bottom wall 47 and bottom wall louvered openings 48. A top flange of the side wall 46 includes clips or brackets 49 for holding a tray 35 and/or pan 30 in a position with a small spacing or gap. In order to provide a uniform gap entirely around the top edge of unit 45, additional small projections or buttons 51 extend upwardly from the top face of the flange to additionally support the tray or pan.

The embodiment of FIG. 7 shows a small cut out 50 which may assist in grasping a pan when the arrangement of FIG. 6 is not used. It will, of course, be understood that the arrangement of FIG. 7 may also be formed without the cut out 50.

While the drawings all show a circular design, it will be understood that the flat bottom wall (15, 26, 47) may have a variety of shapes, e.g. oval, square, rectangular, etc. Also, the support for a baking pan may vary in shape to conform to the shape of any baking pan.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

What is claimed is:

1. A method of baking food in a barbeque grill having a closed top, comprising the steps of:
   (a) providing a flame suppressant and heat dispersing grill overlay comprising a flame resistant metal plate having a plurality of small openings therein whereby heat from the flame flows upwardly through the small openings such as to provide a zone of uniform heating within the barbeque grill above the plate,
   (b) providing a support rack above the flame resistant plate for holding a baking pan a spaced distance above the plate,
   (c) placing a baking pan containing food to be baked on said support rack, and
   (d) baking the food in the baking pan under controlled, uniform heat within the barbeque grill having a closed top.

2. A method according to claim 1 wherein the small openings in the flame resistant plate are in the form of louvered openings preventing any substantial vertical hot air flow therethrough.

3. A method according to claim 2 wherein each said opening comprises a slit in the plate with an upwardly pressed portion of the plate adjacent one side of the slit forming a hood or louver.

4. A method according to claim 3 wherein the grill overlay plate includes an enclosing sidewall, the top of which serves as said support rack for the baking pan.

5. A method according to claim 4 wherein the sidewall includes openings through which hot air flows.

6. A method according to claim 4 wherein the baking pan is supported by support brackets providing an air gap between the top of the sidewall and the baking pan.

7. A method according to claim 4 wherein a perforated tray is placed on said support, with the baking pan resting on the perforated tray.

8. A method according to claim 7 wherein the tray includes a detachable handle for inserting and removing the tray and baking pan from the barbeque.

9. A method according to claim 4 wherein the food is a pizza.

10. A method according to claim 4 wherein the food is pastries.

11. A method according to claim 4 wherein the baking pan is located about two to six inches above the grill overlay plate.

12. A grill overlay unit for baking foods within an enclosed barbeque comprising:
    a flame suppressant and heat dispersing grill overlay comprising a flame resistant metal bottom plate having a plurality of small louvered openings therein permitting heat from the flame to flow upwardly through the small openings while preventing any substantial vertical flow of hot air therethrough, and upturned side walls forming an enclosed air space above the plate, the upper edges of said side walls having support brackets for holding a baking pan with a small air gap between the bottom of the pan and the upper edges of the side walls and at a distance of about two to six inches above the flame resistant metal plate.

13. A grill overlay unit according to claim 12 wherein each said louvered opening comprises a slit in the plate with an upwardly pressed portion of the plate adjacent one side of the slit forming a hood or louver.

14. A grill overlay unit according to claim 12 wherein said upturned side wall contains small openings to provide air circulation.

15. A grill overlay unit according to claim 12 which includes a perforated tray supported by said support brackets and for holding a baking pan, said perforated tray including a detachable handle, for inserting and removing the tray and baking pan from the barbeque.

16. A grill overlay unit for baking foods in a baking pan within an enclosed barbeque comprising:
    a flame suppressant and heat dispersing grill overlay unit comprising a circular bottom formed of flame resistant metal and having a plurality of small openings therein in the form of louvered or hooded vents permitting an upward flow of hot air while preventing any substantial vertical flow, an annular side wall connected to said circular bottom and brackets on the top edge of said annular side wall for holding a pan with a small air gap between the bottom of the pan and the top of the annular side wall.

17. A grill overlay unit according to claim 16 wherein the louvered or hooded vents are adjustable to vary the upward flow of hot air.

* * * * *